(12) United States Patent
Clatty et al.

(10) Patent No.: US 7,601,762 B2
(45) Date of Patent: *Oct. 13, 2009

(54) POLYVINYLCHLORIDE/POLYURETHANE HYBRID FOAMS WITH IMPROVED BURN PROPERTIES AND REDUCED AFTER-GLOW

(75) Inventors: Jan L. Clatty, Moon Township, PA (US); Michael T. Wellman, Moundsville, WV (US); Michael A. Masciantonio, Aliquippa, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 87 days.

This patent is subject to a terminal disclaimer.

(21) Appl. No.: 11/881,603

(22) Filed: Jul. 27, 2007

(65) Prior Publication Data

US 2008/0207784 A1 Aug. 28, 2008

Related U.S. Application Data

(63) Continuation-in-part of application No. 11/710,788, filed on Feb. 26, 2007.

(51) Int. Cl.
*C08L 75/04* (2006.01)

(52) U.S. Cl. .......................... 521/137; 521/99; 521/130; 521/131; 521/170; 521/174

(58) Field of Classification Search ................... 521/99, 521/130, 131, 137, 170, 174
See application file for complete search history.

(56) References Cited

U.S. PATENT DOCUMENTS

| | | | | |
|---|---|---|---|---|
| 3,549,564 A | | 12/1970 | Parker et al. ................. 260/2.5 |
| 5,086,084 A | * | 2/1992 | Michaelson ................. 521/137 |
| 5,173,515 A | | 12/1992 | von Bonin et al. .......... 521/103 |
| 5,302,634 A | | 4/1994 | Mushovic ................... 523/219 |
| 5,369,147 A | | 11/1994 | Mushovic ................... 523/219 |
| 5,508,315 A | | 4/1996 | Mushovic ................... 521/122 |
| 5,604,266 A | | 2/1997 | Mushovic ................... 521/122 |
| 5,739,173 A | | 4/1998 | Lutter et al. .................. 521/99 |
| 6,046,247 A | | 4/2000 | Glück et al. .................. 521/99 |
| 6,211,259 B1 | | 4/2001 | Borden et al. ............... 521/177 |
| 6,265,457 B1 | | 7/2001 | Dolgopolsky et al. ....... 521/155 |
| 6,541,534 B2 | * | 4/2003 | Allen et al. .................. 521/174 |
| 6,583,192 B2 | | 6/2003 | Falke et al. .................. 521/130 |
| 6,586,486 B2 | | 7/2003 | Falke et al. .................. 521/124 |
| 6,613,827 B2 | | 9/2003 | Lundgard et al. ........... 524/386 |
| 6,638,986 B2 | | 10/2003 | Falke et al. .................. 521/110 |
| 6,649,667 B2 | | 11/2003 | Clatty ......................... 521/170 |
| 6,822,011 B2 | | 11/2004 | Albach et al. ............... 521/137 |
| 6,884,825 B2 | | 4/2005 | Daunch et al. .............. 521/174 |
| 2003/0065045 A1 | * | 4/2003 | Falke et al. .................. 521/155 |

FOREIGN PATENT DOCUMENTS

| | | |
|---|---|---|
| CA | 2 367 730 | 9/2000 |
| GB | 1025914 | 4/1966 |

* cited by examiner

*Primary Examiner*—John Cooney
(74) *Attorney, Agent, or Firm*—Lyndanne M. Whalen; Noland J. Cheung; John E. Mrozinski, Jr.

(57) ABSTRACT

The present invention provides a rigid polyurethane foam comprising the reaction product, at an isocyanate index of from about 90 to about 400, of a polyisocyanate and a polyol component comprising, about 20 wt. % to about 80 wt. %, based on the weight of the polyol component, of a double metal cyanide (DMC)-catalyzed polyether polyol having a number average molecular weight of greater than about 1,000 Daltons (Da), about 80 wt. % to about 20 wt. %, based on the weight of the polyol component, of a sucrose-based polyol having a functionality of from about 2.5 to about 6 and a number average molecular weight of from about 350 Da to less than about 1,000 Da, and about 0 wt. % to about 40 wt. %, based on the weight of the polyol component, of a low molecular weight organic compound having a number average molecular weight of less than about 600 Da in the presence of water, polyvinylchloride (PVC) particles having a diameter of from about 0.1 microns to about 200 microns, glass beads having a diameter of from about 40 microns to about 400 microns, and about 1 wt. % to about 30 wt. %, based on the weight of the polyol component, of expanded graphite, optionally, in the presence of at least one of carbon dioxide, surfactants, flame retardants other than expanded graphite, crosslinking agents, pigments and catalysts, wherein the rigid polyurethane foam with a density of about 10 pcf to about 25 pcf has a heat sag measured at 102 mm overhang at 121° C. and one hour of less than about 5 mm and an average after-glow time of less than about 35 seconds. The inventive rigid polyurethane foams exhibit improved burn properties and reduced after-glow while maintaining improved heat sag performance over commercial materials.

23 Claims, No Drawings

POLYVINYLCHLORIDE/POLYURETHANE HYBRID FOAMS WITH IMPROVED BURN PROPERTIES AND REDUCED AFTER-GLOW

The present application is a continuation-in-part of, and claims the benefit of prior application Ser. No. 11/710,788, filed Feb. 26, 2007.

FIELD OF THE INVENTION

The present invention relates, in general to polyurethane, and more specifically, to rigid polyurethane foams which exhibit improved burn properties and reduced after-glow while maintaining improved heat sag performance over commercial materials.

BACKGROUND OF THE INVENTION

Michaelson, in U.S. Pat. No. 5,086,084, describes a foamed polymeric material suitable as a wood substitute, made of a continuous phase of polyurethane having solid polyvinyl chloride particles dispersed therein. The wood-like material of Michaelson is said to contain about 100 parts of a foamable urethane, and 10 to 50 parts polyvinyl chloride (PVC) particles having a particle size below 200 μm. This material has a microcellular structure with cells on the order of 0.1 mm in average diameter or less. The walls are said to be made of a matrix of polyurethane reinforced with PVC particles. Michaelson, however, makes no mention of the heat performance properties of his wood substitute.

U.S. Pat. No. 5,173,515, issued to von Bonin et al., discloses fire retardant elements based on polyurethane foams and expandable graphite additionally containing one or more components from the group consisting of phosphate-containing polyols, borates and amine salts. The foams of von Bonin et al. are said to be useful as construction materials. No mention is made of any effect on heat sag properties or after-glow times.

Mushovic, in U.S. Pat. Nos. 5,302,634, 5,369,147, 5,508,315 and 5,604,266, teaches rigid, lightweight filled resin foams having voids dispersed in a continuous phase which is formed from a polyester polyol-polyurethane hybrid resin having reinforcing particles dispersed therein. The hybrid resin of Mushovic is said to form an interpenetrating polymer network with a polyurethane and/or a modified hybrid polyurethane resin. The foams of Mushovic are said to be useful in building materials requiring high tensile and compressive strengths and corrosion and thermal resistance.

U.S. Pat. No. 6,211,259, issued to Borden et al., describes compositions for making polyurethane and polyurethane foam compositions. These compositions are the reaction product of an isocyanate and a B-Side made of: (i) a polyol having a molecular weight of about 1,000 g/mol or more, and having an average functionality of 2.0 or greater; (ii) a polyol having a Tg of about −80° C. or less, and having a molecular weight of about 1,000 g/mol or more, and having an average functionality of 2.0 or greater; and (iii) a polyhydric alcohol having a molecular weight of about 90 g/mol or more, and having an average functionality of 3.0 or more.

U.S. Pat. No. 6,265,457, issued to Dolgopolsky et al., discloses an isocyanate-based polymer foam made from an isocyanate-based polymer foam matrix having disposed therein a particulate material (such as polyethylene) having an enthalpy of endothermic phase transition of at least about 50 J/g. During the process of Dolgopolsky et al., the particulate material is said to act as a heat sink and undergo an endothermic phase change by absorbing a significant portion of the heat of reaction liberated during the process. Dolgopolsky et al. teach that the heat absorption improves the safety of the process by lowering the maximum exotherm experienced by the foam and/or improves product properties.

Lundgard et al., in U.S. Pat. No. 6,613,827, teach a process for preparing a stable dispersion of a preformed polymer in a polyol in a single mixer. A preformed polymer is mixed under sufficient heat and shear to reduce its particle size to a desired size in the presence of a polyol. The invention of Lundgard et al. also provides stable dispersions of polymers in polyols and polyurethane formulations containing stable dispersions made by their process.

U.S. Pat. Nos. 6,583,192; 6,586,486; and 6,638,986, all issued to Falke et al., discuss the use of expanded graphite as a flameproofing agent in flexible polyurethane foams. No mention is made of the use of such agents in rigid polyurethane foams or of the effect of such materials on heat sag properties or after-glow times.

Albach et al., in U.S. Pat. No. 6,822,011, describes the inclusion of expanded graphite in low density, predominantly open celled, polyurethane foams. No mention is made of the effect of such materials on heat sag properties or after-glow times.

U.S. Pat. No. 6,884,825, issued to Danunch et al. discloses expanded graphite in a listing of flame retardants. No mention is made of the use of such agents in rigid polyurethane foams or of the effect of such materials on after-glow times.

Falke et al., in US Published Patent Application No. 2003-0065045 discuss the use of expanded graphite in rigid polyurethane foams.

A need continues to exist in the art for improved rigid polyurethane foams, such as those having improved burn properties and reduced after-glow, which also maintain other physical properties.

SUMMARY OF THE INVENTION

Accordingly, the present invention provides such a rigid polyurethane foam comprising the reaction product, at an isocyanate index of from about 90 to about 400, of a polyisocyanate and a polyol component comprising, about 20 wt. % to about 80 wt. %, based on the weight of the polyol component, of a double metal cyamide (DMC)-catalyzed polyether polyol having a number average molecular weight of greater than about 1,000 Daltons (Da), about 80 wt. % to about 20 wt. %, based on the weight of the polyol component, of a sucrose-based polyol having a functionality of from about 2.5 to about 6 and a number average molecular weight of from about 350 Da to less than about 1,000 Da, and about 0 wt. % to about 40 wt. %, based on the weight of the polyol component, of a low molecular weight organic compound having a number average molecular weight of less than about 600 Da in the presence of water, polyvinylchloride (PVC) particles having a diameter of from about 0.1 microns to about 200 microns, glass beads having a diameter of from about 40 microns to about 400 microns, and about 1 wt. % to about 30 wt. %, based on the weight of the polyol component, of expanded graphite, optionally, in the presence of at least one of carbon dioxide, surfactants, flame retardants other than expanded graphite, crosslinking agents, pigments and catalysts, wherein the rigid polyurethane foam with a density of about 10 pcf to about 25 pcf has a heat sag measured at 102 mm overhang at 121° C. and one hour of less than about 5 mm and an average after-glow time of less than about 35 seconds.

The inventive rigid polyurethane foams exhibit improved burn properties and reduced after-glow while maintaining improved heat sag performance over commercial materials.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless otherwise indicated.

The present invention provides a rigid polyurethane foam made from the reaction product, at an isocyanate index of from 90 to 400, of a polyisocyanate and a polyol component containing 20 wt. % to 80 wt. %, based on the weight of the polyol component, of a double metal cyamide (DMC)-catalyzed polyether polyol having a number average molecular weight of greater than 1,000 Daltons (Da), 80 wt. % to 20 wt. %, based on the weight of the polyol component, of a sucrose-based polyol having a functionality of from 2.5 to 6 and a number average molecular weight of from 350 Da to less than 1,000 Da, and 0 wt. % to 40 wt. %, based on the weight of the polyol component, of a low molecular weight organic compound having a number average molecular weight of less than 600 Da in the presence of water, polyvinylchloride (PVC) particles having a diameter of from 0.1 microns to 200 microns, glass beads having a diameter of from 40 microns to 400 microns, and 1 wt. % to 30 wt. %, based on the weight of the polyol component, of expanded graphite, optionally, in the presence of at least one of carbon dioxide, surfactants, flame retardants other than expanded graphite, crosslinking agents, pigments and catalysts, wherein the rigid polyurethane foam with a density of 10 pcf to 25 pcf has a heat sag measured at 102 mm overhang at 121° C. and one hour of less than 5 mm and an average after-glow time of less than 35 seconds.

The present invention further provides a process for producing a rigid polyurethane foam involving reacting at an isocyanate index of from 90 to 400 a polyisocyanate with a polyol component containing 20 wt. % to 80 wt. %, based on the weight of the polyol component, of a double metal cyamide (DMC)-catalyzed polyether polyol having a number average molecular weight of greater than 1,000 Daltons (Da), 80 wt. % to 20 wt. %, based on the weight of the polyol component, of a sucrose-based polyol having a functionality of from 2.5 to 6 and a molecular weight of from 350 Da to less than 1,000 Da, and 0 wt. % to 40 wt. %, based on the weight of the polyol component, of a low molecular weight organic compound having a number average molecular weight of less than 600 Da in the presence of water, polyvinylchloride (PVC) particles having a diameter of from 0.1 microns to 200 microns, glass beads having a diameter of from 40 microns to 400 microns, and 1 wt. % to 30 wt. %, based on the weight of the polyol component, of expanded graphite, optionally, in the presence of at least one of carbon dioxide, surfactants, flame retardants other than expanded graphite, crosslinking agents, pigments and catalysts, wherein the rigid polyurethane foam with a density of 10 pcf to 25 pcf has a heat sag measured at 102 mm overhang at 121° C. and one hour of less than 5 mm and an average after-glow time of less than 35 seconds.

The present invention also provides a process for reducing heat sag of a rigid polyurethane foam involving reacting at an isocyanate index of from 90 to 400, a polyisocyanate with a polyol component containing 20 wt. % to 80 wt. %, based on the weight of the polyol component, of a double metal cyamide (DMC)-catalyzed polyether polyol having a number average molecular weight of greater than 1,000 Daltons (Da), 80 wt. % to 20 wt. %, based on the weight of the polyol component, of a sucrose-based polyol having a functionality of from 2.5 to 6 and a molecular weight of from 350 Da to less than 1,000 Da, and 0 wt. % to 40 wt. %, based on the weight of the polyol component, of a low molecular weight organic compound having a number average molecular weight of less than 600 Da in the presence of water, polyvinylchloride (PVC) particles having a diameter of from 0.1 microns to 200 microns, glass beads having a diameter of from 40 microns to 400 microns, and 1 wt. % to 30 wt. %, based on the weight of the polyol component, of expanded graphite, optionally, in the presence of at least one of carbon dioxide, surfactants, flame retardants other than expanded graphite, crosslinking agents, pigments and catalysts, wherein the rigid polyurethane foam with a density of 10 pcf to 25 pcf has a heat sag measured at 102 mm overhang at 121° C. and one hour of less than 5 mm.

The present invention yet further provides a process for reducing after-glow time of a rigid polyurethane foam, involving reacting at an isocyanate index of from 90 to 400 a polyisocyanate with a polyol component containing 20 wt. % to 80 wt. %, based on the weight of the polyol component, of a double metal cyamide (DMC)-catalyzed polyether polyol having a number average molecular weight of greater than 1,000 Daltons (Da), 80 wt. % to 20 wt. %, based on the weight of the polyol component, of a sucrose-based polyol having a functionality of from 2.5 to 6 and a molecular weight of from 350 Da to less than 1,000 Da, and 0 wt. % to 40 wt. %, based on the weight of the polyol component, of a low molecular weight organic compound having a number average molecular weight of less than 600 Da in the presence of water, polyvinylchloride (PVC) particles having a diameter of from 0.1 microns to 200 microns, glass beads having a diameter of from 40 microns to 400 microns, and 1 wt. % to 30 wt. %, based on the weigh of the polyol component, of expanded graphite, optionally, in the presence of at least one of carbon dioxide, surfactants, flame retardants other than expanded graphite, crosslinking agents, pigments and catalysts, wherein the rigid polyurethane foam with a density of 10 pcf to 25 pcf has an average after-glow time of less than 35 seconds.

The inventive rigid polyurethane foams demonstrate greatly reduced heat sag characteristics as compared to those foams made by processes described in the art. The foams of the present invention exhibit a heat sag (as determined by ASTM D-3769) measured at 102 mm overhang at 121° C. and one hour of less than 5 mm, more preferably less than 3 mm, most preferably less than 1 mm.

The rigid polyurethane foams according to the invention are prepared by reacting the inventive polyol component with at least one organic polyisocyanate. Suitable polyisocyanates are known to those skilled in the art and include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in *Justus Liebigs Annalen der Chemie,* 562, pages 75 to 136. Examples of such isocyanates include those represented by the formula

in which n is a number from 2-5, preferably 2-3, and Q is an aliphatic hydrocarbon group containing 2-18, preferably 6-10, carbon atoms; a cycloaliphatic hydrocarbon group containing 4-15, preferably 5-10, carbon atoms; an araliphatic hydrocarbon group containing 8-15, preferably 8-13, carbon atoms; or an aromatic hydrocarbon group containing 6-15, preferably 6-13, carbon atoms.

Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (isophorone diisocyanate; e.g., German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI or polymeric MDI, PMDI), which are described, for example, in GB 878,430 and GB 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in GB 994,890, BE 761,616, and NL 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in GB 889,050; polyisocyanates obtained by telomerization reactions of the type described, for example, in U.S. Pat. No. 3,654,106; polyisocyanates containing ester groups of the type described, for example, in GB 965,474 and GB 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. Those skilled in the art will recognize that it is also possible to use mixtures of the polyisocyanates described above.

In general, it is preferred to use readily available polyisocyanates, such as 2,4- and 2,6-toluene diisocyanates and mixtures of these isomers (TDI); polyphenyl-polymethylene-polyisocyanates of the type obtained by condensing aniline with formaldehyde, followed by phosgenation (crude MDI or polymeric MDI, PMDI); and polyisocyanates containing carbodiimide groups, urethane groups, allophanate groups, isocyanurate groups, urea groups, or biuret groups (modified polyisocyanates). Particularly preferred as polyisocyanate are modified polyisocyanates based on crude MDI or PMDI, and mixtures of these materials with modified polyisocyanates.

Isocyanate-terminated prepolymers may also be employed in the preparation of the foams of the present invention. Prepolymers may be prepared by reacting an excess of organic polyisocyanate or mixtures thereof with a minor amount of an active hydrogen-containing compound as determined by the well-known Zerewitinoff test, as described by Kohler in *Journal of the American Chemical Society*, 49, 3181(1927). These compounds and their methods of preparation are well known to those skilled in the art. The use of any one specific active hydrogen compound is not critical; any such compound can be employed in the practice of the present invention.

The polyol component of the present invention contains at least one sucrose-based polyol having a functionality of from 2.5 to 6 and a molecular weight of from 350 to less than 1,000 Da, more preferably from 600 to less than 1,000 Da, and at least one double metal cyamide (DMC)-catalyzed polyol and optionally at least one low molecular weight organic compound having a molecular weight of less than 600 Da.

The sucrose-based polyol employed in the present invention may be a polyether polyol preferably prepared by reacting sucrose and optionally other initiators (with or without water) with both ethylene oxide and/or propylene oxide in the presence of an alkaline catalyst. The product may be treated with an acid, preferably a hydroxy-carboxylic acid to neutralize the alkaline catalyst. U.S. Pat. No. 4,430,490, which discloses one process for making suitable sucrose-based polyols, is incorporated in its entirety herein by reference thereto. Sucrose polyethers of the type described, for example, in German Auslegeschriften 1,176,358 and 1,064,938 may also be used according to the invention.

The sucrose-based polyether polyol is preferably included in the polyol component in an amount of from 20 to 80% by weight, based on the polyol component, more preferably from 30 to 70% by weight. The sucrose-based polyether polyol may be included in the present invention in an amount ranging between any combination of these values, inclusive of the recited values.

The non-sucrose-based polyether polyol is preferably included in the polyol component in an amount of from 80 to 20% by weight, based on the polyol component, more preferably from 70 to 30% by weight. The non-sucrose-based polyether polyol may be included in the present invention in an amount ranging between any combination of these values, inclusive of the recited values.

As mentioned hereinabove, the non-sucrose based polyol is made in the presence of a double metal cyamide (DMC) catalyst. Any double metal cyamide (DMC) catalyst may be used. Suitable double metal cyamide (DMC) catalysts are known to those skilled in the art. Double metal cyamide complex (DMC) catalysts are non-stoichiometric complexes of a low molecular weight organic complexing agent and optionally other complexing agents with a double metal cyamide salt, e.g. zinc hexacyanocobaltate.

Exemplary double metal cyamide (DMC) complex catalysts for use in the present invention include those suitable for preparation of low unsaturation polyoxyalkylene polyether polyols, such as disclosed in U.S. Pat. Nos. 3,427,256; 3,427,334; 3,427,335; 3,829,505; 4,472,560; 4,477,589; and 5,158,922. The double metal cyamide (DMC) catalysts more preferred are those capable of preparing "ultra-low" unsaturation polyether polyols. Such catalysts are disclosed in U.S. Pat.

Nos. 5,470,813 and 5,482,908, and 5,545,601, the entire contents of which are herein incorporated by reference thereto. Particularly preferred herein are those zinc hexacyanocobaltate catalysts prepared by the methods described in U.S. Pat. No. 5,482,908.

The DMC catalyst concentration is chosen to ensure a good control of the polyoxyalkylation reaction under the given reaction conditions. The catalyst concentration is preferably in the range of from 0.0005 wt. % to 1 wt. %, more preferably in the range of from 0.001 wt. % to 0.1 wt. %, most preferably in the range of from 0.001 to 0.01 wt. %, based on the amount of polyol to be produced. The DMC catalyst concentration may be in an amount ranging between any combination of these values, inclusive of the recited values.

As those skilled in the art are aware, an organic complexing ligand may be included with the DMC catalyst. Any organic complexing ligand may be part of the DMC catalyst in the process of the present invention, such as the organic complexing ligands described in U.S. Pat. Nos. 3,404,109, 3,829,505, 3,941,849, 5,158,922 and 5,470,813, as well as in EP 0,700,949, EP 0,761,708, EP 0,743,093, WO 97/40086 and JP 4,145,123. Such organic complexing ligands include water-soluble organic compounds with heteroatoms, such as oxygen, nitrogen, phosphorus or sulfur, which can form complexes with the DMC compound. Preferred as organic complexing ligands, are alcohols, aldehydes, ketones, ethers, esters, amides, ureas, nitriles, sulfides and mixtures thereof. More preferred organic complexing ligands include water-soluble aliphatic alcohols, such as, for example, ethanol, isopropanol, n-butanol, iso-butanol, sec-butanol and tert-butanol. Tert-butanol is most preferred.

The DMC catalysts may optionally contain at least one functionalized polymer. "Functionalized polymer" as used herein is a polymer or its salt that contains one or more functional groups including oxygen, nitrogen, sulfur, phosphorus or halogen. Examples of functionalized polymers preferred in the inventive process include, but are not limited to, polyethers, polyesters, polycarbonates, polyalkylene glycol sorbitan esters, polyalkylene glycol glycidyl ethers, polyacrylamides, poly(acrylamide-co-acrylic acids), polyacrylic acids, poly(acrylic acid-co-maleic acids), poly(N-vinylpyrrolidone-co-acrylic acids), poly(acrylic acid-co-styrenes) and the salts thereof, maleic acids, styrenes and maleic anhydride copolymers and the salts thereof, block copolymers composed of branched chain ethoxylated alcohols, alkoxylated alcohols such as NEODOL (sold by Shell Chemical Co.), polyether, polyacrylonitriles, polyalkyl acrylates, polyalkyl methacrylates, polyvinyl methyl ethers, polyvinyl ethyl ethers, polyvinyl acetates, polyvinyl alcohols, poly-N-vinylpyrrolidones, polyvinyl methyl ketones, poly(4-vinylphenols), oxazoline polymers, polyalkyleneimines, hydroxyethylcelluloses, polyacetals, glycidyl ethers, glycosides, carboxylic acid esters of polyhydric alcohols, bile acids and their salts, esters or amides, cyclodextrins, phosphorus compounds, unsaturated carboxylic acid esters and ionic surface- or interface-active compounds. Polyether polyols are most preferably used as the functionalized polymer herein.

Where used, functionalized polymers may be present in the DMC catalyst in an amount of from 2 to 80 wt. %, preferably, from 5 to 70 wt. %, more preferably, from 10 to 60 wt. %, based on the total weight of DMC catalyst. The functionalized polymers may be present in the DMC catalyst in an amount ranging between any combination of these values, inclusive of the recited values. In addition, a catalyst polyol suspension, such as described in U.S. Pat. No. 6,699,961, may be used.

Suitable starter or initiator compounds for making the DMC-catalyzed, non-sucrose based polyol include, but are not limited to, $C_1$-$C_{30}$ monols, ethylene glycol, diethylene glycol, triethylene glycol, propylene glycol, dipropylene glycol, tripropylene glycol, pentaerythritol, neopentyl glycol, 1,3propanediol, 1,4butanediol, 1,2butanediol, 1,3butanediol, 2,3butanediol, 1,6hexanediol, water, glycerin, trimethylolpropane, trimethylolethane, ethylene diamine, mixture of isomers of toluene diamine, α-methylglucoside, sorbitol, mannitol, hydroxymethylglucoside, hydroxypropylglucoside, N,N,N',N'-tetrakis[2-hydroxyethyl or 2-hydroxypropyl]ethylene diamine, 1,4-cyclohexanediol, cyclohexanedimethanol, hydroquinone, resorcinol and the like. Mixtures of monomeric initiators or their oxyalkylated oligomers may also be utilized. Preferred initiator compounds are ethylene glycol, propylene glycol, glycerin, trimethylolpropane, and sorbitol.

Alkylene oxides useful in making the non-sucrose based, DMC-catalyzed polyol include, but are not limited to, ethylene oxide, propylene oxide, 1,2- and 2,3-butylene oxide, isobutylene oxide, epichlorohydrin, cyclohexene oxide, styrene oxide, and the higher alkylene oxides such as the $C_5$-$C_{30}$ α-alkylene oxides. Other alkylene oxides mixed with propylene oxide may prove useful in the inventive processes.

Suitable low molecular weight organic compounds to be used in preparing the rigid polyurethane foams as described hereinabove include those compounds having a molecular weight of less than 600, and an average functionality of from 1.0 to 3.0, preferably 1.5 to 2.5, and most preferably 1.8 to 2.2. These compounds are carefully selected from the group consisting of diols, triols, and mixtures thereof, polyethers, polyesters, polythioethers, polyacetals, polycarbonates, and amine terminated polyethers of the type known for the production of polyurethanes. Preferred compounds include the polyethers and polyesters containing from 1.5 to 4.0, preferably 2.0 to 3.0 isocyanate-reactive groups, and having molecular weights of less than 600. Some examples of suitable compounds include, for example, glycols such as, for example, ethylene glycol, propylene glycol, 1,3-propane diol, 1,4-butanediol, 1,6-hexamethylene glycol, dipropylene glycol, tripropylene glycol, diethylene glycol, triethylene glycol, tetraethylene glycol, tetrapropylene glycol, heptapropylene glycol, neopentyl glycol, 2,2,4-trimethyl-1,5-pentanediol, etc. Also suitable compounds include, for example, diamines, triamines, and aminoalcohols such as ethylene diamine, toluene diamine, diethylenetriamine, ammonia, aminoalcohols which can be prepared by the alkoxylation of ammonia, 2,4'-, 2,2'- and 4,4'-methylene dianiline, 2,6- and/or 2,4-toluene diamine and vicinal toluene diamines, p-aminoaniline, 1,5-diaminonaphthalene, mixtures of methylene dianiline and its higher homologs, ethylene diamine, propylene diamine, diethylene triamine, 1,3-diaminopropane, 1,3-diaminobutane and 1,4-diaminobutane, ethanolamine, diethanolamine, and aminoethylethanolamine. Ethylene diamine and toluene diamines are particularly preferred. Preferred polyether compounds include the propylene oxide and ethylene oxide addition products with the glycols, amines, and aminoalcohols mentioned above. Preferred polyesters are obtained from the glycols above, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be unsaturated and/or substituted, e.g. by halogen atoms. Examples of these acids include succinic acid, adipic acid, suberic acid, azelaic acid, sebacic acid, phthalic acid, isophthalic acid, trimellitic acid, phthalic acid anhydride, tetrahydropthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid (which may be mixed with monomeric fatty acids), dimethyl terephthalate and bis-glycol terephthalate. These low molecular weight polyols also include compounds such as, for example, cyclohexanedimethanol and the diverse bisphenols.

The low molecular weight organic compound is preferably included in the polyol component in an amount ranging from 0 to 40% by weight, based on the weight of the polyol component, more preferably from 0 to 20% by weight. The low molecular weight organic compound may be included in the present invention in an amount ranging between any combination of these values, inclusive of the recited values.

The isocyanate and polyol components are reacted in the presence of expanded graphite, polyvinyl chloride ("PVC") and glass beads. The present inventors have surprisingly found that the inclusion of expanded graphite, polyvinyl chloride ("PVC") and glass beads in the polyurethane formulations of the present invention greatly reduces the after-glow observed in rigid polyurethane foams. "After-glow" as used herein means that the material remains hot enough to glow after it has been ignited and the material flame has gone out. As those skilled in the art can appreciate, long after-glow times may be undesirable for rigid polyurethane foams, which frequently are used in or as building materials, because the glowing material may act as an ember which can ignite other adjacent materials. The inventive foams display greatly reduced after-glow times as compared to rigid polyurethane foams available in the art. The inventive foams exhibit an after-glow time of less than 35 seconds, preferably less than 30 seconds, more preferably less than 20 seconds, even more preferably less than 15 seconds and most preferably less than 10 seconds.

As those skilled in the art are aware, among its many uses expanded graphite is often marketed as a flame retardant. The expanded graphite preferably is included in amounts of from 1 to 30 by weight, based on the polyol component, more preferably from 1 to 20 wt. %, and most preferably from 1 to 15 wt. %. The expanded graphite may be included in the present invention in an amount ranging between any combination of these values, inclusive of the recited values.

Polyvinyl chloride is produced by polymerizing vinyl chloride by suspension, emulsion, or solution methods. It may be copolymerized with up to 50% of other compatible monomers. PVC is processed by several methods including blow molding, extrusion, calendering, and coating. Plastisols having PVC resin particles dispersed in a liquid phase of a PVC plasticizer are used to produce coatings and molded products. PVC is resistant to weathering, moisture, most acids, fats, petroleum hydrocarbons and fungi. It is dimensionally stable, and has good dielectric properties. It is commonly used for piping and conduits, containers, liners, and flooring.

Polyvinyl chloride resins useful herein are also well-known copolymers rich in vinyl chloride moieties. Such resins may include up to 50% by weight of a co-monomer such as other vinyls or an acrylate. Alternatively, particles may be purchased commercially from manufacturers such as Goodyear Tire and Rubber Corp., B.F. Goodrich, Westchem International, and Tenneco, Inc. In the present invention, two grades of polyvinyl chloride particles may preferably be utilized. A first grade of particles, a dispersion grade, has particles with diameters less than about 15 microns, an inherent viscosity of 1.20, and a specific gravity of 1.4. The second grade, a blending grade, preferably has particles with a diameter of about 50 microns and an inherent viscosity of 1.13. The instant invention may include mixtures of PVC particles having diameters below 200 microns. The molecular weight of the PVC may vary widely. PVC's having an average molecular weight within the range of 80,000 to 500,000 or higher may preferably be used. Generally, the molecular weight (or inherent viscosity) is not an important factor.

The glass beads included in the polyurethane forming formulation are preferably spherical or nearly so. These glass beads, which may be solid or hollow, preferably have a mean diameter in the range of from 40 to 400 microns, more preferably from 25 to 150 microns. Any type of glass may be used in making the beads, including soda, soda-lime and borosilicate glass. The glass beads may be uncoated or coated as is known to those skilled in the art.

The isocyanate and polyol components are reacted optionally in the presence of at least one of surfactants, flame retardants other than expanded graphite, pigments, catalysts and fillers. Sufficient water is included so that the density of the resulting rigid foams lies between 10 and 25 pcf.

It may be advantageous to employ a minor amount of a surfactant to stabilize the foaming reaction mixture until it obtains rigidity. Any suitable surfactant can be employed in the invention, including silicone/ethylene oxide/propylene oxide copolymers. Examples of surfactants useful in the present invention include those commercially available from manufacturers including Witco Corp., Air Products and Goldschmidt AG. Other suitable surfactants are described in U.S. Pat. Nos. 4,365,024 and 4,529,745. Other, less preferred surfactants include polyethylene glycol ethers of long chain alcohols, tertiary amine or alkanolamine salts of long chain alkyl acid sulfate esters, alkylsulfonic esters, alkylarylsulfonic acids. Such surfactants are employed in amounts sufficient to stabilize the foaming reaction mixture against collapse and the formation of large, and uneven cells. The surfactant may be included in the polyol component in an amount of from 0.05 to 10, and preferably from 0.1 to 6, weight percent of the polyol component. The surfactant may be included in the present invention in an amount ranging between any combination of these values, inclusive of the recited values.

Suitable optional flame retardants (as used herein also refers to smoke suppressants and other known combustion modifiers), include phosphonates, phosphites, and phosphates (such as dimethyl methylphosphonate, ammonium polyphosphate, and various cyclic phosphate and phosphonate esters, as well as, reactive oligomeric organophosphates having functionality greater than one, known to those skilled in the art); halogen-containing compounds known in the art (such as brominated diphenyl ether and other brominated aromatic and aliphatic compounds); melamine; antimony oxides (such as antimony pentoxide and antimony trioxide); zinc compounds (such as various known zinc borates); aluminum compounds (such as alumina trihydrate); magnesium compounds (such as magnesium hydroxide); and urea. The optional flame retardant may be included in an amount of from 5 to 75 wt. % of the polyol component, more preferably from 10 to 65 wt. % and most preferably from 10 to 55 wt. %. The optional flame retardant may be included in the present invention in an amount ranging between any combination of these values, inclusive of the recited values.

Suitable catalysts include tertiary amines and metal compounds known to those skilled in the art. Suitable tertiary amine catalysts include triethylamine, tributylamine, triethylene diamine, N-methylmorpholine, N-ethylmorpholine, N,N,N',N'-tetramethylethylene diamine, pentamethyldiethylene triamine, and higher homologs, 1,4-diazabicyclo[2.2.2] octane, N-methyl-N'-(dimethylaminoethyl)-piperazine, bis (dimethylaminoalkyl)piperazines, N,N-dimethylbenzylamine, N,N-dimethylcyclohexylamine, N,N-diethylbenzylamine, bis(N,N-diethylaminoethyl)adipate, N,N,N',N'-tetramethyl-1,3-butanediamine, N,N-dimethyl-β-phenylethylamine, amine salt of diazabicycloundecene and formic acid, 1,2-dimethylimidazole, 2-methylimidazole, monocyclic and bicyclic amidines, bis (dialkylamino)alkyl ethers (U.S. Pat. No. 3,330,782), and tertiary amines containing amide groups (preferably formamide groups). The catalysts used may also be the known Mannich bases of secondary amines (such as dimethylamine) and aldehydes (preferably formaldehyde) or ketones (such as acetone) and phenols.

Suitable catalysts also include certain tertiary amines containing isocyanate-reactive hydrogen atoms. Examples of such catalysts include triethanolamine, triisopropanolamine, N-methyldiethanolamine, N-ethyldiethanolamine, N,N-dimethylethanolamine, their reaction products with alkylene oxides (such as propylene oxide and/or ethylene oxide) and secondary-tertiary amines.

Other suitable catalysts include organic metal compounds, especially organic tin, bismuth, and zinc compounds. Suitable organic tin compounds include those containing sulfur, such as dioctyl tin mercaptide and, preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutylin maleate, and dioctyltin diacetate. Suitable bismuth compounds include bismuth neodecanoate, bismuth versalate, and various bismuth carboxylates known in the art. Suitable zinc compounds include zinc neodecanoate and zinc versalate. Mixed metal salts containing more than one metal (such as carboxylic acid salts containing both zinc and bismuth) are also suitable catalysts. Any of the above-mentioned catalysts may, of course, be used as mixtures. Suitable catalyst mixtures may be found in U.S. Pat. No. 5,401,824.

The catalyst(s) may be included in the polyol component in an amount preferably such that the catalyst(s) chosen produce the desired reactivity profile based on the chosen volume of blowing agent used.

When carrying out the reaction of the polyol component with the polyisocyanate, the quantity of the polyisocyanate should preferably be such that the isocyanate index is from 90 to 400, more preferably from 95 to 150. The isocyanate index of the foams of the present invention may range between any combination of these values, inclusive of the recited values. By "isocyanate index" is meant the quotient of the number of isocyanate groups divided by the number of isocyanate-reactive groups, multiplied by 100. The foam-forming formulation in the present invention is preferably a liquid at room temperature.

The inventors herein contemplate that the foamed products of the present invention may be used, for example, as building materials, such as lightweight roofing materials (slates or tiles), as decorative or architectural products, as outdoor products, as low cost insulation panels, as fencing, as lightweight buoyant or corrosion-resistant marine products, etc., by forming the foamed resin in a mold of suitable size and shape.

EXAMPLES

The present invention is further illustrated, but is not to be limited, by the following examples. All quantities given in "parts" and "percents" are understood to be by weight, unless otherwise indicated.

| | |
|---|---|
| POLYOL A | a polyether polyol available from Harvin Reaction Technology, Inc. as HARVINOL PE-450; |
| POLYOL B | a DMC-catalyzed, polyether polyol based on propylene glycol and propylene oxide having a hydroxyl number of about 111 mg KOH/g and a functionality of about 2; |
| POLYOL C | a sucrose-initiated polyether polyol having an OH number of about 470 mg KOH/g and a functionality of 5.2; |
| DEG | diethylene glycol from Dow Chemical; |
| SURFACTANT | polyalkylene oxide methyl siloxane copolymer available from OSI as NIAX L 1000; |
| CATALYST A | di-n-octyltin bis(isooctyl mercaptoacetate) available from GE Silicones as FOMREZ UL-29; |
| CATALYST B | dibutyltin dilaurate, available from Air Products as DABCO T-12; |
| CATALYST C | a 70 weight % solution of bis(dimethylaminoethyl) ether in dipropylene glycol, available from OSI as NIAX A-1; |
| CATALYST D | a delayed action amine catalyst, available from GE Silicones as NIAX A-510; |
| ISOCYANATE A | a carbodiimide modified diphenylmethane diisocyanate terminated polyester prepolymer having an isocyanate content of about 18.9% by weight; |
| ISOCYANATE B | a modified polymeric methylenediphenyl diisocyanate having an NCO content of about 30.5; |
| SOLID GLASS BEADS | glass beads (100/200 mesh), available from Flex-O-Lite, Inc. as BLAST-O-LITE Beads; |
| PVC A | particles of vinyl chloride, available from Colorite Specialty Resins as Suspension Homopolymer Resin CP 501; having an average particle size of about 45 microns; |
| PVC B | polyvinyl chloride particles, available from Geon, Inc. as GEON 121AR; having an average particle size of about 1 micron; |
| EXPANDED GRAPHITE | available from Nyacol Nano Technologies, as NYAGRAPH FP; |
| FLAME RETARDANT A | decabromodiphenyl oxide, available from Great Lakes Chemicals, as Great Lakes DE-83R; |
| FLAME RETARDANT B | bis(pentabromophenyl) ethane, available from Albemarle Co. as SAYTEX 8010; |
| FLAME RETARDANT C | 1,2-bis(tetrabromophthalimido) ethane, available from Albemarle Co. as SAYTEX BT93; |
| FLAME RETARDANT D | antimony (III) oxide; |
| PIGMENT A | a brown pigment, available from Hoover Color Corp. as BR 677 DRY; and |
| PIGMENT B | a brown pigment, available from Ricon Colors Inc. as DPU-B2371-2B. |

Comparative Example 1 and Examples 2-6

Rigid foams were made by combining the components in the amounts given below in Table I. Processing details for these foams are also given below in Table I. Prior to conducting the examples, the mold was treated with CT 2002, an external mold release agent (available from Chem-Trend). These Examples assessed the effect of different flame retardants and different amounts of those flame retardants on the performance of the resultant material. The rigid foams made in the Examples were subjected to physical property testing as follows: density (ASTM D1622); heat sag (ASTM D3769); and cone calorimetry—a small scale burn test which evaluates with high precision the heat release rates and smoke generation (specific extinction area) generated over time as well as other burn characteristics not monitored for this application.

As can be appreciated by reference to Table I below, when the expanded graphite is not included in the urethane formula (Example 2), the heat resistance quickly increases and the foam burns rapidly; more importantly, the after-glow is greatly increased. Smoke generation remains comparable to foam produced by existing technology (Comparative Example C1) and reports less because the sample was consumed more quickly. When including the expanded graphite in the final urethane (Examples 3-6), the heat release rates and smoke are all reduced beyond that of Comparative Example C1, and the glow time can be reduced substantially by the introduction of the expanded graphite. These examples illustrate that alternative flame retardants A, B, or C can be interchanged and used in combination with the expanded graphite to achieve the reduced after-glow and burn improvements as well as by using the expanded graphite itself at higher loadings.

by the previous examples, on the performance of the resultant material. Rigid foams were made by combining the components in the amounts given below in Table II. Processing

TABLE I

| Component | Ex. C1 | Ex. 2 | Ex. 3 | Ex. 4 | Ex. 5 | Ex. 6 |
|---|---|---|---|---|---|---|
| POLYOL A | 43.84 | — | — | — | — | — |
| POLYOL B | — | 33 | 33 | 33 | 33 | 33 |
| POLYOL C | — | 10 | 10 | 10 | 10 | 10 |
| DEG | — | 7 | 7 | 7 | 7 | 7 |
| SURFACTANT | 0.45 | 0.45 | 0.45 | 0.45 | 0.45 | 0.45 |
| WATER | 0.409 | 0.409 | 0.409 | 0.409 | 0.409 | 0.409 |
| CATALYST A | — | 0.85 | 0.85 | 0.85 | 0.85 | 0.85 |
| CATALYST B | 0.18 | — | — | — | — | — |
| CATALYST C | 0.06 | — | — | — | — | — |
| CATALYST D | — | 0.05 | 0.05 | 0.05 | 0.05 | 0.05 |
| SOLID GLASS BEADS | 32.98 | 15 | 15 | 15 | 15 | 15 |
| PVC A | 7.447 | — | — | — | — | — |
| PVC B | 4.255 | 2 | 2 | 2 | 2 | 2 |
| EXPANDED GRAPHITE | — | — | 1.7 | 6.7 | 1.7 | 1.7 |
| FLAME RETARDANT A | 7.447 | 5 | — | — | — | 5 |
| FLAME RETARDANT B | — | — | — | — | 5 | — |
| FLAME RETARDANT C | — | — | 5 | — | — | — |
| FLAME RETARDANT D | 3.617 | 1.7 | — | — | — | — |
| PIGMENT A | 2.128 | — | — | — | — | — |
| PIGMENT B | — | 1.43 | 1.43 | 1.43 | 1.43 | 1.43 |
| ISOCYANATE A | 110 | — | — | — | — | — |
| ISOCYANATE B | — | 58.72 | 58.72 | 58.72 | 58.72 | 58.72 |
| Average Physical Testing | | | | | | |
| Thickness (in.) | 0.5 | 0.5 | 0.5 | 0.5 | 0.5 | 0.5 |
| Density (lb/ft$^3$) | 20 | 18 | 18 | 18 | 18 | 18 |
| Heat Sag (4"/250 F./1 Hr) (mm) | 9 | N.D. | N.D. | N.D. | N.D. | 0.5 |
| Cone calorimeter-heat release rate @ peak @ 75 kw/m$^2$ flux energy (kW/m$^2$) | 502 | 627.2 | 401.2 | 312.4 | 405.4 | 429.6 |
| Cone calorimeter-specific extinction area @ peak @ 75 kW/m$^2$ flux energy (m$^2$/kg) | 1,723 | 1,464 | 1,012 | 765.5 | 1,288 | 1,471 |
| Avg. after-glow time from cone calorimeter (sec) | 10 | >5 min. | 27.5 | 34.5 | 26.5 | 14 |
| Processing Details | | | | | | |
| Filled ratio A/100 B | 107 | 66 | 66 | 66 | 66 | 66 |
| Index | 105 | 130 | 130 | 130 | 130 | 130 |
| Machine or Lab | handmix | handmix | handmix | handmix | handmix | handmix |
| Polyol temperature (° F.) | 72 | 72 | 72 | 72 | 72 | 75 |
| Isocyanate temperature (° F.) | 72 | 72 | 72 | 72 | 72 | 75 |
| Mold temperature (° F.) | 140 | 140 | 140 | 140 | 140 | 140 |
| Demold time (min.) | 20 | 20 | 20 | 20 | 20 | 15 |
| Type of sample | panel | panel | panel | panel | panel | panel |
| Sample thickness (in.) | 0.5 | 0.5 | 0.5 | 0.5 | 0.5 | 0.5 |

N.D.—not determined.

Examples 7-10

These Examples assessed the effect of cross linking with different amounts of diethylenglycol in the presence of the preferred expanded graphite flame retardant, as determined details for these foams are also given below in Table II. Prior to conducting the examples, the mold was treated with CT 2002, an external mold release agent (available from Chem-Trend). The rigid foams made in the examples were subjected to physical property testing as follows: density (ASTM D1622); heat sag (ASTM D3769) and cone calorimetry.

TABLE II

| Component | Ex. 7 | Ex. 8 | Ex. 9 | Ex. 10 |
|---|---|---|---|---|
| POLYOL B | 30 | 27 | 28 | 25 |
| POLYOL C | 10 | 10 | 15 | 15 |
| DEG | 10 | 13 | 7 | 10 |
| SURFACTANT | 0.45 | 0.45 | 0.45 | 0.45 |
| WATER | 0.409 | 0.409 | 0.409 | 0.409 |
| CATALYST A | 0.85 | 0.85 | 0.85 | 0.85 |

TABLE II-continued

|  | Ex. 7 | Ex. 8 | Ex. 9 | Ex. 10 |
|---|---|---|---|---|
| CATALYST D | 0.05 | 0.05 | 0.05 | 0.05 |
| SOLID GLASS BEADS | 15 | 15 | 15 | 15 |
| PVC B | 2 | 2 | 2 | 2 |
| EXPANDED GRAPHITE | 1.7 | 1.7 | 1.7 | 1.7 |
| FLAME RETARDANT A | 5 | 5 | 5 | 5 |
| PIGMENT B | 1.43 | 1.43 | 1.43 | 1.43 |
| ISOCYANATE B | 67.8 | 76.88 | 64.45 | 73.53 |
| Average Physical Testing | | | | |
| Thickness (in.) | 0.5 | 0.5 | 0.5 | 0.5 |
| Density (lb/ft$^3$) | 19 | 18 | 19 | 19 |
| Heat sag (4"/250 F./1 Hr) (mm) | 3.2 | 4.2 | 3.0 | 2.3 |
| Cone calorimeter-heat release rate @ peak @ 75 kw/m$^2$ flux energy (kW/m$^2$) | 309.2 | 375.9 | 343.2 | 362.6 |
| Cone calorimeter-specific extinction area @ peak @ 75 kw/m$^2$ flux energy (m$^2$/kg) | 1,174 | 1,303 | 1,249 | 1,022 |
| Avg. after-glow time from cone calorimeter (sec) | 12 | 10.5 | 8.5 | 19 |
| Processing Details | | | | |
| Filled ratio A/100B | 74 | 81 | 71 | 78 |
| Index | 130 | 130 | 130 | 130 |
| Machine or Lab | handmix | handmix | handmix | handmix |
| Polyol temperature (° F.) | 75 | 75 | 75 | 75 |
| Isocyanate temperature (° F.) | 75 | 75 | 75 | 75 |
| Mold temperature (° F.) | 140 | 140 | 140 | 140 |
| Demold time (min.) | 15 | 15 | 15 | 15 |
| Type of sample | panel | panel | panel | panel |
| Sample thickness (in.) | 0.5 | 0.5 | 0.5 | 0.5 |

As can be appreciated by reference to Table II above, the after-glow of the final urethane produced can be further improved by adjusting the DEG and Polyol C levels. As the DEG content is increased or the Polyol C level increased, the after-glow is reduced to levels comparable or lower than current technology while still reducing further the heat sag, heat release rates and smoke generation beyond the control.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A rigid polyurethane foam comprising the reaction product, at an isocyanate index of from about 90 to about 400, of:
   a polyisocyanate; and
   a polyol component comprising,
      about 20 wt. % to about 80 wt. %, based on the weight of the polyol component, of a double metal cyanide (DMC)-catalyzed polyether polyol having a number average molecular weight of greater than about 1,000 Daltons (Da),
      about 80 wt. % to about 20 wt. %, based on the weight of the polyol component, of a sucrose-based polyol having a functionality of from about 2.5 to about 6 and a number average molecular weight of from about 350 Da to less than about 1,000 Da, and
      about 0 wt. % to about 40 wt. %, based on the weight of the polyol component, of a low molecular weight organic compound having a number average molecular weight of less than about 600 Da;
   in the presence of
      water,
      polyvinylchloride (PVC) particles having a diameter of from about 0.1 microns to about 200 microns,
      glass beads having a diameter of from about 40 microns to about 400 microns, and
      about 1 wt. % to about 30 wt. %, based on the weight of the polyol component, of expanded graphite,
   optionally, in the presence of at least one of carbon dioxide, surfactants, flame retardants other than expanded graphite, crosslinking agents, pigments and catalysts,
wherein the rigid polyurethane foam with a density of about 10 pcf to about 25 pcf has a heat sag measured at 102 mm overhang at 121° C. and one hour of less than about 5 mm.

2. The rigid polyurethane foam according to claim 1, wherein the polyvinylchloride (PVC) particles have a diameter of from about 0.1 microns to about 50 microns.

3. The rigid polyurethane foam according to claim 1, wherein the glass beads have a diameter of from about 25 microns to about 150 microns.

4. The rigid polyurethane foam according to claim 1, wherein the double metal cyanide (DMC)-catalyzed polyether polyol comprises from about 30 wt. % to about 70 wt. %, based on the weight of the polyol component.

5. The rigid polyurethane foam according to claim 1, wherein the sucrose-based polyol comprises from about 70 wt. % to about 30 wt. %, based on the weight of the polyol component.

6. The rigid polyurethane foam according to claim 1, wherein the low molecular weight organic compound comprises from about 0 wt. % to about 20 wt. %, based on the weight of the polyol component.

7. The rigid polyurethane foam according to claim 1, wherein the expanded graphite is present in an amount of from about 1 wt. % to about 20 wt. %, based on the weight of the polyol component.

8. The rigid polyurethane foam according to claim 1, wherein the expanded graphite is present in an amount of from about 1 wt. % to about 15 wt. %, based on the weight of the polyol component.

9. The rigid polyurethane foam according to claim 1, wherein the rigid polyurethane foam has a heat sag measured at 102 mm overhang at 121° C. and one hour of less than about 3 mm.

10. The rigid polyurethane foam according to claim 1, wherein the rigid polyurethane foam has a heat sag measured at 102 mm overhang at 121° C. and one hour of less than about 1 mm.

11. A process for producing a rigid polyurethane foam comprising reacting at an isocyanate index of from about 90 to about 400:
a polyisocyanate; with
a polyol component comprising,
    about 20 wt. % to about 80 wt. %, based on the weight of the polyol component, of a double metal cyanide (DMC)-catalyzed polyether polyol having a number average molecular weight of greater than about 1,000 Daltons (Da),
    about 80 wt. % to about 20 wt. %, based on the weight of the polyol component, of a sucrose-based polyol having a functionality of from about 2.5 to about 6 and a molecular weight of from about 350 Da to less than about 1,000 Da, and
    about 0 wt. % to about 40 wt. %, based on the weight of the polyol component, of a low molecular weight organic compound having a number average molecular weight of less than about 600 Da;
in the presence of
    water,
    polyvinylchloride (PVC) particles having a diameter of from about 0.1 microns to about 200 microns,
    glass beads having a diameter of from about 40 microns to about 400 microns, and
    about 1 wt. % to about 30 wt. %, based on the weight of the polyol component, of expanded graphite,
    optionally, in the presence of at least one of carbon dioxide, surfactants, flame retardants other than expanded graphite, crosslinking agents, pigments and catalysts,
wherein the rigid polyurethane foam with a density of about 10 pcf to about 25 pcf has a heat sag measured at 102 mm overhang at 121° C. and one hour of less than about 5 mm.

12. The process according to claim 11, wherein the polyvinylchloride (PVC) particles have a diameter of from about 0.1 microns to about 50 microns.

13. The process according to claim 11, wherein the glass beads have a diameter of from about 25 microns to about 150 microns.

14. The process according to claim 11, wherein the double metal cyanide (DMC)-catalyzed polyether polyol comprises from about 30 wt. % to about 70 wt. %, based on the weight of the polyol component.

15. The process according to claim 11, wherein the sucrose-based polyol comprises from about 70 wt. % to about 30 wt. %, based on the weight of the polyol component.

16. The process according to claim 11, wherein the low molecular weight organic compound comprises from about 0 wt. % to about 20 wt. %, based on the weight of the polyol component.

17. The process according to claim 11, wherein the expanded graphite is present in an amount of from about 1 wt. % to about 20 wt. %, based on the weight of the polyol component.

18. The process according to claim 11, wherein the expanded graphite is present in an amount of from about 1 wt. % to about 15 wt. %, based on the weight of the polyol component.

19. The process according to claim 11, wherein the rigid polyurethane foam has a heat sag measured at 102 mm overhang at 121° C. and one hour of less than about 3 mm.

20. The process according to claim 11, wherein the rigid polyurethane foam has a heat sag measured at 102 mm overhang at 121° C. and one hour of less than about 1 mm.

21. A process for reducing heat sag of a rigid polyurethane foam comprising reacting at an isocyanate index of from about 90 to about 400, a polyisocyanate with a polyol component comprising about 20 wt. % to about 80 wt. %, based on the weight of the polyol component, of a double metal cyanide (DMC)-catalyzed polyether polyol having a number average molecular weight of greater than about 1,000 Daltons (Da), about 80 wt. % to about 20 wt. %, based on the weight of the polyol component, of a sucrose-based polyol having a functionality of from about 2.5 to about 6 and a molecular weight of from about 350 Da to less than about 1,000 Da, and about 0 wt. % to about 40 wt. %, based on the weight of the polyol component, of a low molecular weight organic compound having a number average molecular weight of less than about 600 Da in the presence of water, polyvinylchloride (PVC) particles having a diameter of from about 0.1 microns to about 200 microns, glass beads having a diameter of from about 40 microns to about 400 microns, and about 1 wt. % to about 30 wt. %, based on the weight of the polyol component, of expanded graphite, optionally, in the presence of at least one of carbon dioxide, surfactants, flame retardants other than expanded graphite, crosslinking agents, pigments and catalysts, wherein the rigid polyurethane foam with a density of about 10 pcf to about 25 pcf has a heat sag measured at 102 mm overhang at 121° C. and one hour of less than about 5 mm.

22. The process according to claim 21, wherein the rigid polyurethane foam has a heat sag measured at 102 mm overhang at 121° C. and one hour of less than about 3 mm.

23. The process according to claim 21, wherein the rigid polyurethane foam has a heat sag measured at 102 mm overhang at 121° C. and one hour of less than about 1 mm.

* * * * *